(12) United States Patent
Reber

(10) Patent No.: US 12,154,055 B2
(45) Date of Patent: Nov. 26, 2024

(54) VIRTUAL AGENT SYSTEM AND METHOD FOR MODELLING ORGANIZATION PROCESSES THEREFOR

(71) Applicant: Telepathy Labs, Inc., Tampa, FL (US)

(72) Inventor: Martin Reber, Zurich (CH)

(73) Assignee: Telepathy Labs, Inc., Tampa, FL (US)

( * ) Notice: Subject to any disclaimer, the term of this patent is extended or adjusted under 35 U.S.C. 154(b) by 425 days.

(21) Appl. No.: 17/267,549

(22) PCT Filed: Aug. 9, 2019

(86) PCT No.: PCT/US2019/045987
§ 371 (c)(1),
(2) Date: Feb. 10, 2021

(87) PCT Pub. No.: WO2020/033881
PCT Pub. Date: Feb. 13, 2020

(65) Prior Publication Data
US 2021/0312355 A1    Oct. 7, 2021

Related U.S. Application Data

(60) Provisional application No. 62/717,210, filed on Aug. 10, 2018.

(51) Int. Cl.
*G06F 40/35* (2020.01)
*G06F 21/62* (2013.01)
(Continued)

(52) U.S. Cl.
CPC ......... *G06Q 10/0637* (2013.01); *G06F 21/62* (2013.01); *G06F 40/35* (2020.01);
(Continued)

(58) Field of Classification Search
USPC .............. 704/246, 247, 251, 252, 275
See application file for complete search history.

(56) References Cited

U.S. PATENT DOCUMENTS

2002/0111922 A1\* 8/2002 Young ............... G06Q 10/10
705/80
2008/0082390 A1    4/2008 Hawkins et al.
(Continued)

FOREIGN PATENT DOCUMENTS

KR    101760061 B1    7/2017

OTHER PUBLICATIONS

International Search Report and Written Opinion mailed on Jan. 6, 2020 in International Application Serial No. PCT/US2019/045987.

*Primary Examiner* — Leonard Saint-Cyr
(74) *Attorney, Agent, or Firm* — Michael T. Abramsom; Jordan IP Law, LLC

(57) ABSTRACT

A method, computer program product, and virtual agent system for an organization. The virtual agent system may include one or more processors and one or more memories configured to perform operations. The operations may include loading at least one model related to one or more processes of the organization where the model may be based on the structure information and one or more of procedures and protocols related to the organization. A process request, related to the at least one or more processes of the organization, from a user of the organization, may be received and analyzed.

19 Claims, 9 Drawing Sheets

(51) Int. Cl.
- *G06Q 10/0637* (2023.01)
- *G06Q 10/067* (2023.01)
- *G06Q 10/105* (2023.01)
- *G10L 15/18* (2013.01)
- *G10L 15/22* (2006.01)

(52) U.S. Cl.
CPC ......... *G06Q 10/067* (2013.01); *G06Q 10/105* (2013.01); *G10L 15/1815* (2013.01); *G10L 15/22* (2013.01)

(56) References Cited

U.S. PATENT DOCUMENTS

| | | |
|---|---|---|
| 2009/0204470 A1 | 8/2009 | Weyl et al. |
| 2012/0143385 A1* | 6/2012 | Goldsmith .............. H02J 3/466 |
| | | 700/297 |
| 2013/0006887 A1 | 1/2013 | Balko |
| 2018/0082683 A1 | 3/2018 | Chen et al. |
| 2018/0343238 A1* | 11/2018 | Tola ................... H04L 63/0421 |

* cited by examiner

VIRTUAL AGENT SYSTEM AND METHOD FOR MODELLING ORGANIZATION PROCESSES THEREFOR

CROSS-REFERENCE TO RELATED APPLICATIONS

This application is a U.S. National Stage of International Patent Application No. PCT/US2019/045987, filed on Aug. 9, 2019, which claims priority to U.S. Provisional Application Ser. No. 62/717,210, filed on Aug. 10, 2018, the disclosures of which are incorporated herein by reference in their entirety.

RELATED CASES

This application claims the benefit of U.S. Provisional Application No. 62/717,210 filed on 10 Aug. 2018, the contents of which are all incorporated by reference.

BACKGROUND

Modelling of business processes (BPs) have been used in enterprises and quality management systems. Some of these modelling systems generally provide modelling of company activities and statuses. Some of these systems provide role-based modelling with respect to responsibility, scope, authorization, and security. Such process modelling techniques have utilized subroutines and standardized modelling blocks (e.g., for decision making). Some systems have workflow models that typically use trigger events indicating when to start or perform workflow steps.

BRIEF SUMMARY OF DISCLOSURE

In some implementations, provided is a virtual agent system including one or more processors and one or more memories configured to perform operations that may include but are not limited to loading at least one model related to one or more processes of an organization wherein the model may be based on structure information and one or more of procedures and protocols related to the organization. Operations also may include receiving and analyzing a process request, related to the at least one or more processes of the organization, from a user of the organization, and to implement the at least one model to execute the at least one or more processes in response to the process request.

One or more of the following example features or aspects may be included. Receiving and analyzing the process request may be in the form of at least one of speech, text, haptic, gesture, and graphic. The process request may be in the form of natural language speech.

In some implementations, the structure information may be included in a set of structure definitions that refer to a structure definitions library. In some implementations, the structure definitions library may comprise at least one of a user role in the organization, user responsibility in the organization, roles definitions, organization chart, access rights, and an instance state context.

In some implementations, the one or more of procedures and protocols may be included in a set of behavior definitions that refer to a behavior definitions library. In some implementations, the behavior definitions library may comprise a plurality of atomic dialog definitions. Each atomic dialog definition of the plurality of atomic dialog definitions may correspond to at least one codec element. In some implementations, the at least one codec element may encapsulate one of audio enhancement, automatic speech recognition (ASR), natural language understanding (NLU), natural language generation (NLG), text-to-speech (TTS), and dialog manager. The atomic dialog definitions may be parameterizable. The behavior definitions library may comprise sub-processes related to the one or more processes of the organization.

In some implementations, the loading of at least one model as well as the receiving and analyzing of the process request may be implemented in a user device. Operations may include storing process data related to the organization in a database, and using a security interface to limit access to the process data based on a profile of the user of a user device. Further, the security interface may be configured to at least one of access rights, process rights, distribute rights, communicate rights, and execute rights.

In some implementations, a computer program product residing on a computer readable storage medium having a plurality of instructions stored thereon which, when executed across one or more processors, may cause at least a portion of the one or more processors to perform operations that may include but are not limited to loading at least one model related to one or more processes of an organization wherein the model may be based on structure information and one or more of procedures and protocols related to the organization. Operations may include receiving and analyzing a process request, related to the at least one or more processes of the organization, from a user of the organization, and to implement the at least one model to execute the at least one or more processes in response to the process request.

One or more of the following example features or aspects may be included. For example, analyzing the process request may be based on predefined atomic dialog definitions. The predefined atomic dialog definitions may be parameterizable. Each atomic dialog definition may correspond to at least one codec element encapsulating one of audio enhancement, automatic speech recognition (ASR), natural language understanding (NLU), natural language generation (NLG), text-to-speech (TTS), and dialog manager.

In another embodiment or example implementation, a computer-implemented method for an organization may include but is not limited to loading at least one model related to one or more processes of the organization wherein the model may be based on structure information and one or more of procedures and protocols related to the organization. A process request, related to the at least one or more processes of the organization, may be received from a user of the organization and the process request may be analyzed. The at least one model may be implemented to execute the at least one or more processes in response to the process request.

One or more of the following example features or aspects may be included. The computer-implemented method may further comprise analyzing the process request based on a plurality of predefined atomic dialog definitions, wherein the atomic dialog definitions may be parameterizable. In some implementations, each atomic dialog definition of the plurality of predefined atomic dialog definitions may correspond to at least one codec element encapsulating one of audio enhancement, automatic speech recognition (ASR), natural language understanding (NLU), natural language generation (NLG), text-to-speech (TTS), and dialog manager.

Some example implementations or embodiments may include but are not limited to: a virtual agent system, a method of using a virtual agent system, an application client container system, a method of using an application client container system, a computer-implemented method, a computing system including one or more processors and one or more memories configured to perform operations, a computer program product residing on a computer readable storage medium having a plurality of instructions stored thereon which, when executed across one or more processors, causes at least a portion of the one or more processors to perform operations substantially as described herein, and an apparatus configured substantially as described herein.

The details of one or more example implementations are set forth in the accompanying drawings and the description below. Other possible example embodiments features, aspects, and/or possible example advantages will become apparent from the description, the drawings, and the claims. Some implementations may not have those possible example features and/or possible example advantages, and such possible example embodiments, features, aspects, and/ or possible example advantages may not necessarily be required of some implementations.

BRIEF DESCRIPTION OF THE DRAWINGS

Like reference symbols in the various drawings indicate like elements.

DETAILED DESCRIPTION

Figure 1:
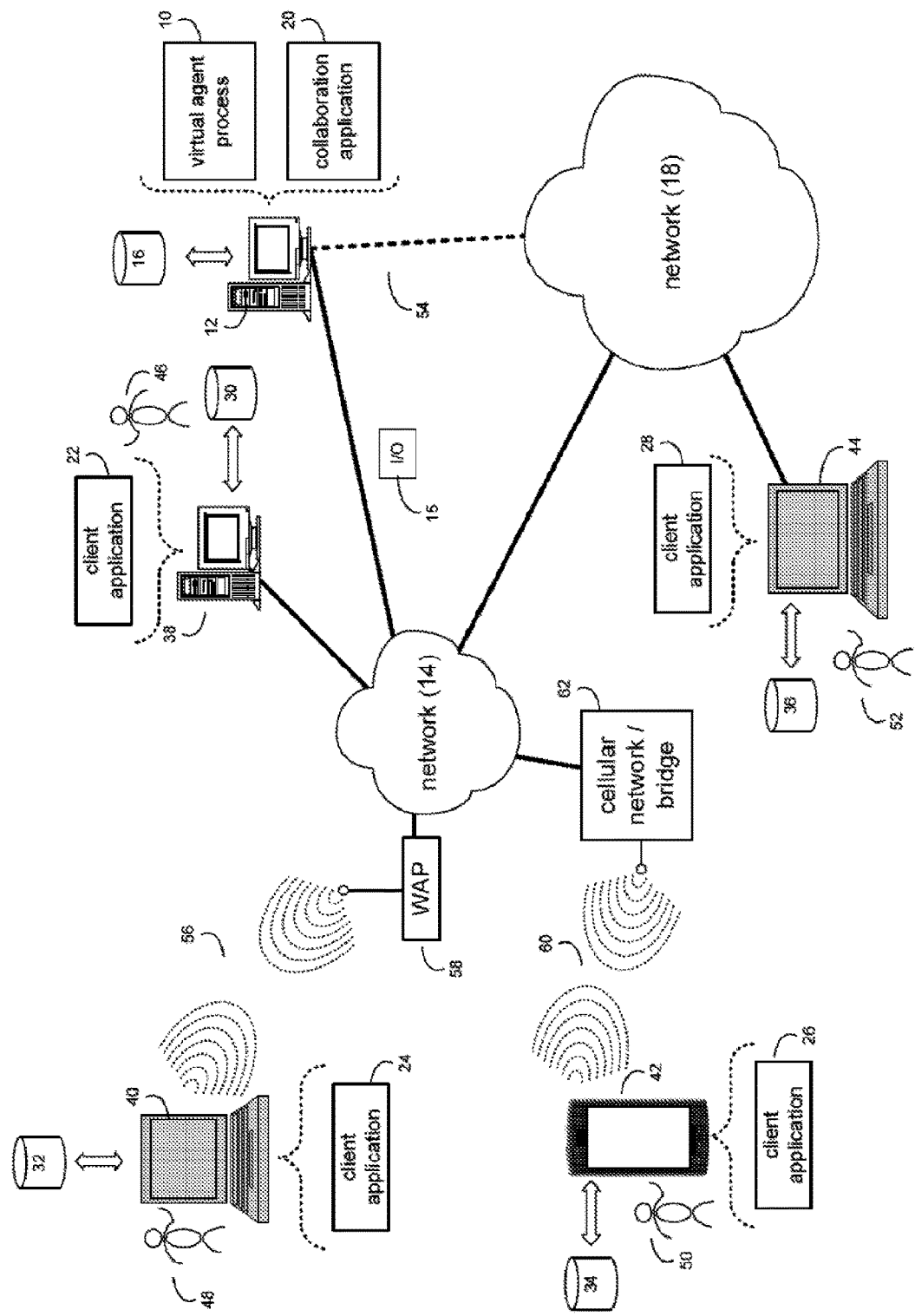
FIG. 1 is an example diagrammatic view of a virtual agent process coupled to an example distributed computing network according to one or more example implementations of the disclosure.

Virtual assistants for use in enterprise environment, such as an "auto-attendant" that answers the phone for a user similar to a personal assistant, may simply redirect the call to a human or take a voice message. Such an assistant typically cannot help the user with other business-related tasks. More intelligent enterprise assistants may engage with users to assist with general tasks such as setting reminders, finding weather information, or responding to a message, but these assistants generally need to be specifically and individually programmed according to the needs of the user with respect to business requirements in order to handle such tasks. That is, such assistants may require coding of many applications with complex and individual behavior and it may be too difficult to roll out all of these individual applications at once, especially if several hardware or software platforms should be supported. Such an approach may be expensive, burdensome and time consuming.

As more and more organizations are considering employment of virtual agents in enterprise environments to support their employees for performing regular tasks, there is a need to provide virtual agents capable of having an interaction with a user to understand the user's needs with respect to business processes, and which can be easily deployed in an organization without the need of complex programming.

System Overview:

In some implementations, the present disclosure may be embodied as a system, method, apparatus, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown virtual agent process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac OS X®; Red Hat® Linux®, or a custom operating system. (Microsoft and Windows are registered trademarks of Microsoft Corporation in the United States, other countries or both: Mac and OS X are registered trademarks of Apple Inc. in the United States, other countries or both: Red Hat is a registered trademark of Red Hat Corporation in the United States, other countries or both; and Linux is a registered trademark of Linus Torvalds in the United States, other countries or both).

In some implementations, as will be discussed below in greater detail, a virtual agent process, such as virtual agent process 10 of FIG. 1, may define at least one model related to one or more processes of an organization based on structure information and one or more of procedures and protocols related to the organization. Virtual agent process 10 may include receiving and analyzing a process request, related to the at least one or more processes of the organization, from a user of the organization, and to implement the at least one model to execute the at least one or more processes in response to the process request.

In some implementations, the instruction sets and subroutines of the virtual agent process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive: a flash drive, a tape drive: an optical drive: a RAID array (or other array): a random access memory (RAM); and a read-only memory (ROM).

In some implementations, network 14 may be connected to one or more secondary networks (e.g., network 18), examples of which may include but are not limited to: a local area network: a wide area network: or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, virtual agent process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a collaboration application (e.g., collaboration application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration. In some implementations, virtual agent process 10 and/or collaboration application 20 may be accessed via one or more of client applications 22, 24, 26, 28. In some implementations, virtual agent process 10 may be a standalone application, or may be an applet/application/script/extension that may interact with and/or be executed within collaboration application 20, a component of collaboration application 20, and/or one or more of client applications 22, 24, 26, 28. In some implementations, collaboration application 20 may be a standalone application, or may be an applet/application/script/extension that may interact with and/or be executed within virtual agent process 10, a component of virtual agent process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of virtual agent process 10 and/or collaboration application 20. Examples of client applications 22, 24, 26, 28 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of virtual agent process 10 (and vice versa). Accordingly, in some implementations, virtual agent process 10 may be a purely server-side application, a purely client-side application, or a hybrid server-side/client-side application that is cooperatively executed by one or more of client applications 22, 24, 26, 28 and/or virtual agent process 10.

In some implementations, one or more of client applications 22, 24, 26, 28 may be configured to effectuate some or all of the functionality of collaboration application 20 (and vice versa). Accordingly, in some implementations, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, virtual agent process 10, and collaboration application 20, taken singly or in any combination, may effectuate some or all of the same functionality, any description of effectuating such functionality via one or more of client applications 22, 24, 26, 28, virtual agent process 10, collaboration application 20, or combination thereof, and any described interaction(s) between one or more of client applications 22, 24, 26, 28, virtual agent process 10, collaboration application 20, or combination thereof to effectuate such functionality, should be taken as an example only and not to limit the scope of the disclosure.

In some implementations, one or more of users 46, 48, 50, 52 may access computer 12 and virtual agent process 10 (e.g., using one or more of client electronic devices 38, 40, 42, 44) directly through network 14 or through secondary network 18. Further, computer 12 may be connected to network 14 through secondary network 18, as illustrated with phantom link line 54. Virtual agent process 10 may include one or more user interfaces, such as browsers and textual or graphical user interfaces, through which users 46, 48, 50, 52 may access virtual agent process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-FiR, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
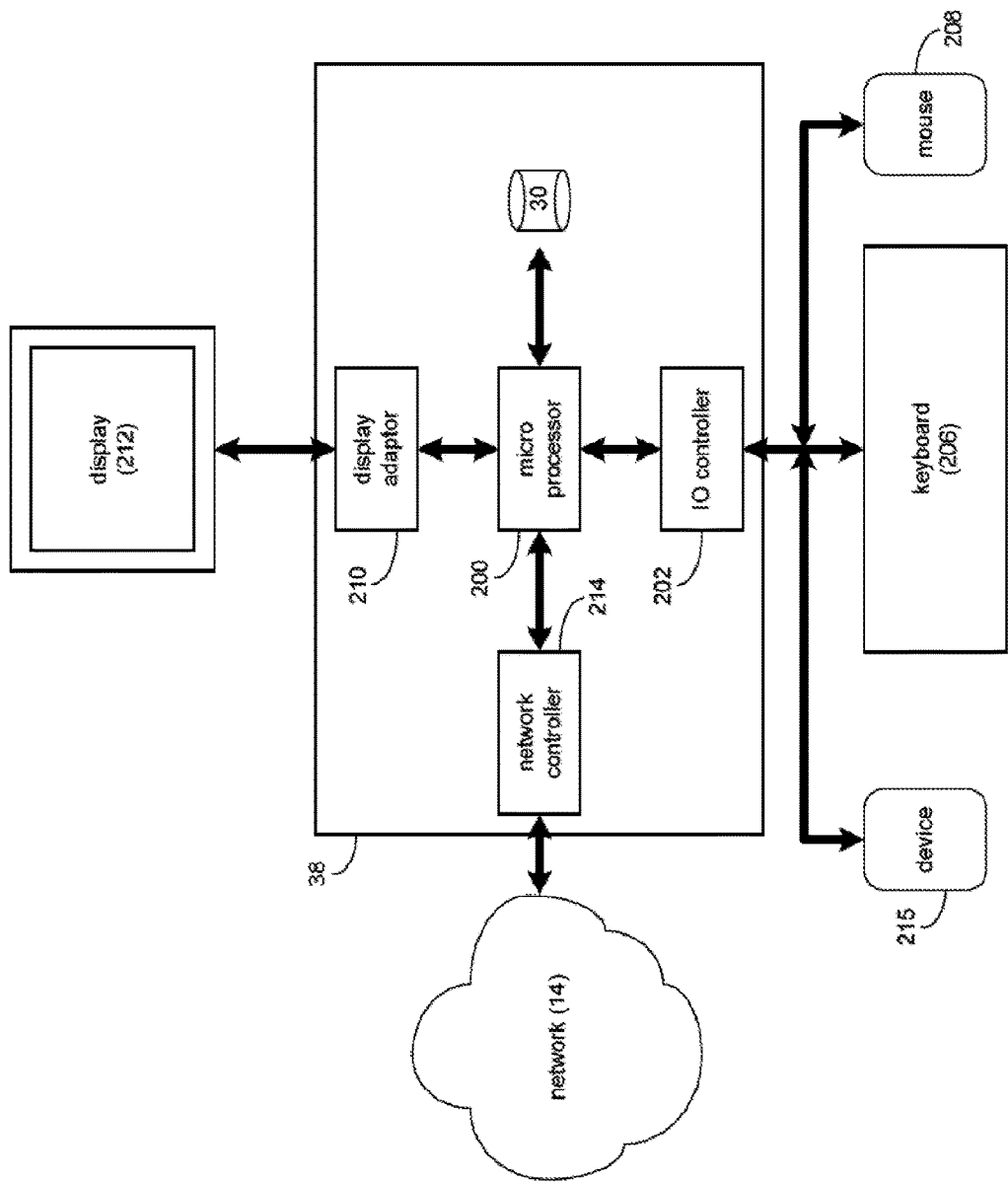
FIG. 2 is an example diagrammatic view of a client electronic device of FIG. 1 according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, virtual agent process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as key board 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 3:
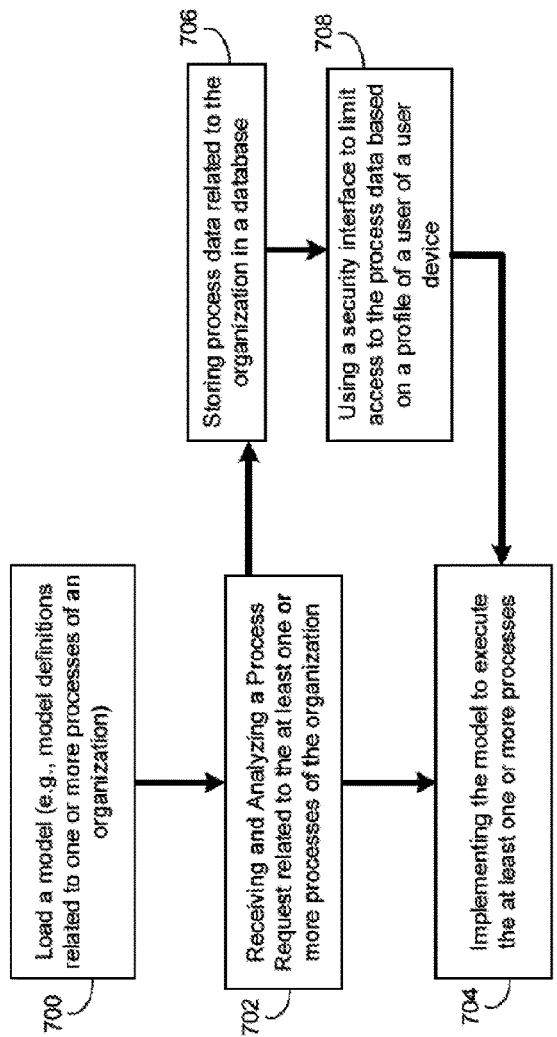
FIG. 3 is an example flowchart of the virtual agent process according to one or more example implementations of the disclosure.

FIG. 3 shows example steps involved in the virtual agent process 10. This computer-implemented virtual agent process 10 may be used with an organization and may be executed, at least in part, by a virtual agent system. The virtual agent process 10 lists various steps involved in implementation of a virtual agent for a user of the organization. For example, virtual agent process 10 may load 700 at least one model related to one or more processes of an organization. The model (e.g., modelled definitions) may be based on structure information and one or more of procedures and protocols related to the organization. For example, the modelled definitions, such as behavior definitions and/or structure definitions, may be related to one or more processes of the organization. These modelled definitions may be loaded. In examples, the model (e.g., modelled definitions) may be pre-defined (e.g., defined prior to the model being loaded) such that the model may be defined based on structure information and behavior information (as described in subsequent paragraphs below). Virtual agent process 10 may receive and analyze 702 a process request, related to the at least one or more processes of the organization, from a user of the organization. As described in subsequent paragraphs, the process request may be received by a multi-modal engine or a speech engine depending on the implementation and the form of process request. Further, in some implementations, the process request may be analyzed by the multi-modal engine or the speech engine. Virtual agent process 10 may implement 704 the model to execute the at least one or more processes in response to the process request (i.e., execute process or processes corresponding to the process request). In examples, the process data for execution of the process may be obtained from a company's database. In some implementations, when the "model" may be implemented, one or more processes may be executed based on the loaded "model" (e.g., depending on model definitions and/or instructions of loaded model). In some examples, the virtual agent process 10 may store 706 process data related to the organization in a database and may use 708 a security interface to limit access to the process data based on a profile of a user of a user device. These steps, related to data storage and access rights (e.g., whether user1 may be allowed to speak to user2 or whether user1 may share a document with user2), may occur at a few different stages within the virtual agent process 10. For example, these steps may occur when loading 700 the at least one model (e.g., structural analysis of access rights when loading the model), when receiving and analyzing 702 the process request as shown in FIG. 3 (e.g., verify if a request is for a user and can be executed depending on data to process and the people/entities/roles involved e.g. is the user allowed to give my assistant tasks?), and/or when implementing 704 the model to execute the at least one or more processes (e.g., implementing means that a user is now active according to a loaded business process such that the virtual agent process 10 may also decide about accessible data and involved parties). In some implementations, the functions noted in any of the block(s) of FIG. 3 may occur out of the order noted in FIG. 3. For example, two blocks shown in succession may, in fact, be executed substantially concurrently, or the blocks may sometimes be executed in the reverse order, depending upon the functionality involved.

As will be discussed below, the virtual agent process 10 is integrated into a practical application that may at least help, e.g., improve existing technological processes associated with, e.g., virtual agents necessarily rooted in computer technology.

It will be appreciated that the computer processes described throughout may not be considered to be well-understood, routine, and conventional functions.

Virtual Agent System:

As discussed above and referring also at least to the example implementations of FIGS. 3-9, virtual agent system 100 (hereinafter, sometimes simply referred to as "system 100") may include a definitions module 302. The definitions module 302 may include structure definitions 320 that may refer to a structure definitions library 304. Structure definitions 320 may be defined as a set of definitions relating to structures, objects and/or instances in an organization (e.g., organization chart). The structure definitions library 304 may include information related to an organization specifically referenced details of the structures, objects, and/or instances of the organization. The definitions module 302 may include behavior definitions 322 that refer to a behavior definitions library 306. Behavior definitions 322 may be defined as a set of definitions relating to protocols, behaviors, and/or processes of objects within an organization. The behavior definitions library 306 may include information about one or more of procedures and protocols related to the organization specifically one or more referenced behaviors of objects related to the organization. In some implementations, the definitions module 302 of the virtual agent system 100 may be configured to define at least one model (also sometimes referred to as "behavior model") related to one or more processes of the organization based on the structure definitions and behavior definitions about the one or more of procedures and protocols related to the organization. In some implementations, the virtual agent system 100 may further include a client application 308 configured to load definitions, receive and analyze a process request (e.g., related to at least one process of the organization) from a user of the organization and may implement the at least one model to execute the at least one process in response to the received process request.

The virtual agent system 100 may be implemented in an organization for assisting the user by combining natural language processing (NLP) with other forms of artificial intelligence (AI), primarily machine learning and deep learning, to provide sophisticated and intelligent assistance to the user for modeling and executing organization processes and to expand the use cases beyond customer service and simple tasks. The system 100 may enable modelling the behavior of a virtual agent by using existing data files already available in an organization (for example, business process models, organization charts, role descriptions, flow charts, etc.). Furthermore, the system 100 may provide a modeling approach for a virtual agent which may be language independent.

The term "organization," as used herein, is intended to be construed generally, and may include, in addition to for-profit entities, other types of entities or organizations in which individuals interact to achieve particular goals, and has been interchangeably used with "business," "company," "enterprise," "industry" and the like. Further, the term "organization process" as used herein is intended to be construed generally, so as to include, without limitation, a business workflow, a business application, a portal application, or other sequence or arrangement of processing steps associated with a business activity or function, and has been interchangeably used with "business process," "company process," "enterprise process," "industry process" and the like.

Figure 4:
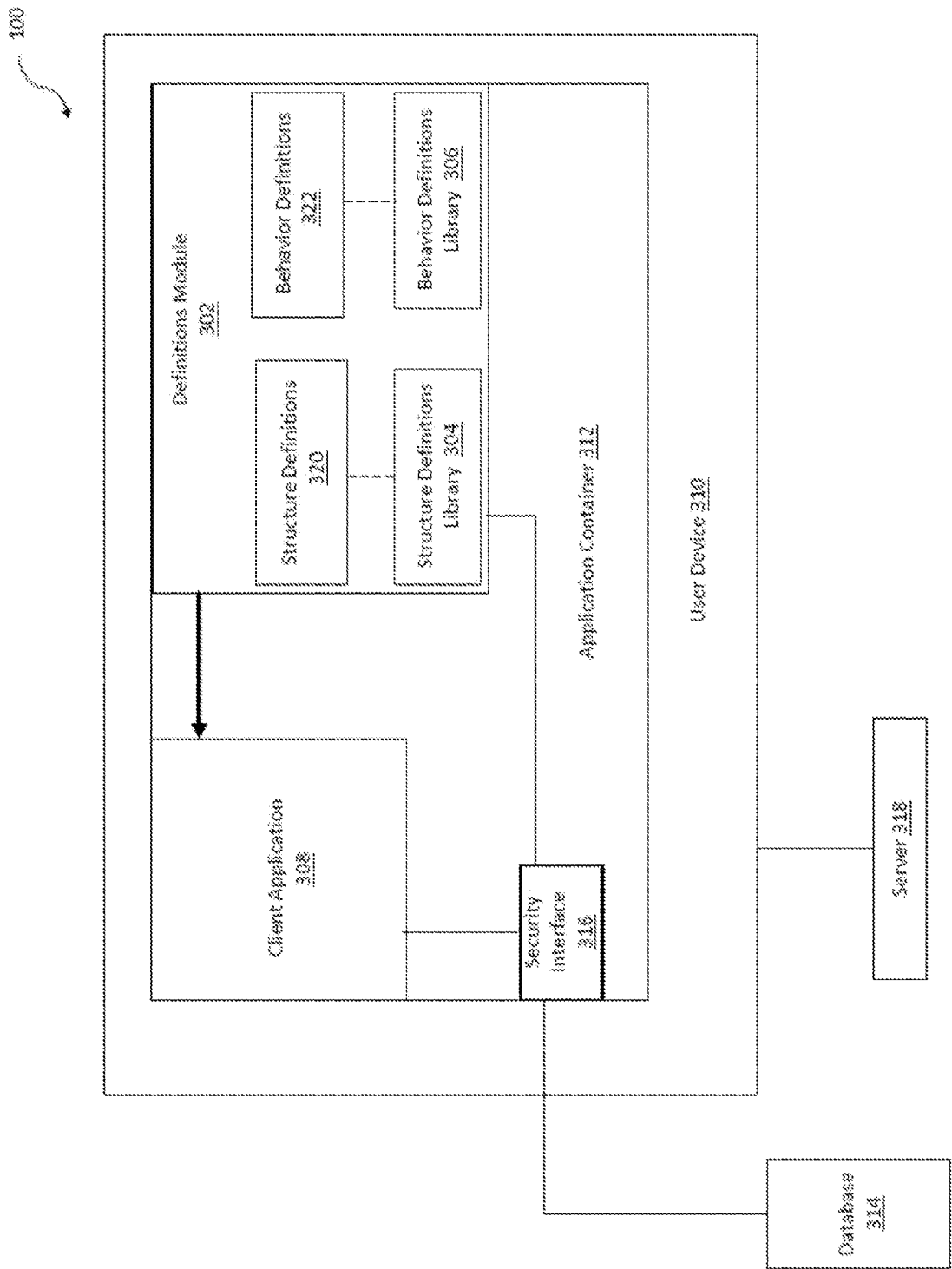
FIG. 4 is an example schematic view of a virtual agent system according to one or more example implementations of the disclosure.

As shown in the example implementation of FIG. 4, virtual agent system 100 may include a client electronic device, such as user device 310. The user device 310 may include any type of computing device (including the above-noted client electronic devices) that is configured to perform an operation, such as receiving input from the user, and, optionally, provide an output to the user. For example, user device 310 may be implemented as a smart device, a laptop computer, a desktop computer, a server, a smart phone, an electronic reader device, a mobile handset, a personal digital assistant (PDA), a portable navigation device, a portable gaming device, a tablet computer, a wearable computer (e.g., a watch, a pair of glass with computing capabilities, etc.), a portable media player, a television, a set-top box, a computer system in a car, an appliance, a camera, a robot, a hologram system, a security system, a room-based computer system (e.g., intercom system, office media system, etc.), and so on. In example implementations, the user device 310 and computer 12 (shown in FIG. 1) may be used interchangeably.

In some implementations, the user device 310 may include application container 312 which may, generally, be a virtual machine configured to host and execute the applications and programs of virtual agent system 100 of the present disclosure. In some implementations, application container 312 may host definitions module 302 and client application 308.

Further, in some implementations, virtual agent system 100 may include database 314 (such as the above-noted datastores) for storing processes and company data related to the organization and its activities. In some implementations, the virtual agent system 100 may also include a security interface 316 communicably disposed between the database 314 and the user device 310. The security interface 316 may be hosted in application container 312. The security interface 316 may be configured to limit and secure access to the processes and company data (as stored in the database 314) by the user device 310 based on a profile of the user associated with the user device 310 (as discussed in detail in the subsequent paragraphs). Thus, the security interface 316 may provide security measures between application container 312 and external systems devices (e.g., database 314). The security interface 316 may limit access to company data, e.g. encrypt, decrypt, and/or decode to restrict strengths in confidentiality. The security interface 316 may be further configured to access, process, distribute, or communicate rights and execute rights. The security interface 316 may be configured to at least one of access rights (e.g., rights to view or process data/info such as a balance sheet), process rights (e.g., rights to execute a business process/task e.g., to do a purchase or book a meeting for the CEO), distribute rights (e.g., rights to share info/documents (e.g., share a balance sheet for participants of a CFO meeting)), communicate rights (e.g., rights to ask the CEO for details in a specific matter, or right to share confidential info to a specific audience), and execute rights (e.g., rights to execute a task such as mark a room as booked for a certain meeting). The security interface 316 may be a separate system that may be modelled (e.g., security model with respect to who may communicate with whom, who may be allowed to execute processes, etc.).

Additionally, in some implementations, the virtual agent system 100 may include server 318 disposed in direct (or indirect) communication with user device 310. The server 318 may be located remotely from user device 310. Herein, server 318 may include any type of computing device (including the above-noted computing devices) that is configured to perform an operation, such as receiving input from the user, and, optionally, provide an output to the user.

In some example embodiments, as shown in FIG. 4, the virtual agent system 100 may include user device 310, server 318, and database 314. In other example embodiments, the virtual agent system 100 may be run on one device such as computer 12. Alternatively, the virtual agent system 100 may be run on multiple devices such as computer 12 and one or more of client electronic devices 38, 40, 42, 44.

In virtual agent system 100, definitions module 302 may be configured to define at least one behavior model related to one or more processes of the organization (e.g., model of process relating to a user's behavior or multiple users' behavior within an organization such as workflow and/or steps involved in setting up a meeting, generating a sales report, generating status report and sending to team, etc.) based on the structure definitions 320 (e.g., an organization chart of a company having a CEO heading some departments and a secretary supporting the CEO, department names and people/employees in the role of department heads, reporting roles may be defined such as the CEO's secretary reporting to the CEO, etc.). The structure definitions 320 may refer to the structure definitions library 304 (e.g., refer to details of each entity used in the structure definitions library, such as names or contact details of department heads or branch details of the organization chart such as details of a department, etc.). The one or more processes of the organization may also be based on behavior definitions 322 (and may optionally refer to the behavior definitions library 304, e.g. sequence of steps which are frequently reused for behavior definitions) and may be based on the one or more of procedures and protocols related to the organization (e.g., a process of the CEO secretary with relevant processes belonging to the role of the CEO secretary where the related process definitions may detail steps and their sequence on how to organize a management team meeting and the process may refer to definitions in the structure definitions e.g. identifying people who report to the CEO). Further, client application 308 may be configured to load definitions (e.g., structure definitions 320 and behavior definitions 322), receive and analyze a process request (e.g., related to at least one process of the organization) from a user of the organization. Specifically, for example, the client application 308 (e.g., a control unit of the client application 308) may load and analyze the definitions from the definitions module 302. The client application 308 may further be configured to implement or run the behavior model, as received from the definitions module 302, to execute the at least one process in response to the received process request.

Figure 5A:
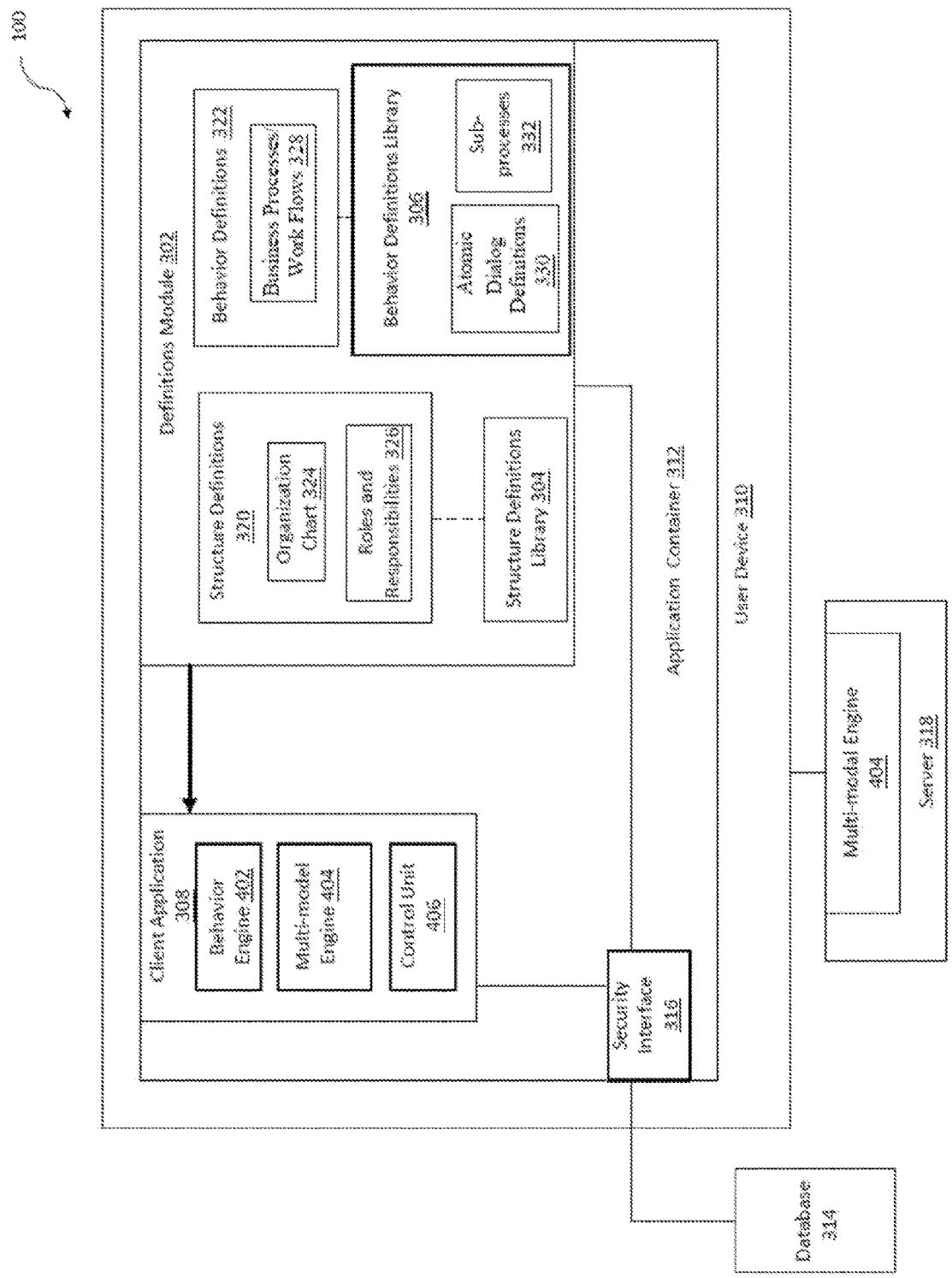
FIG. 5A is an example schematic view of the virtual agent system of FIG. 4 according to one example implementation of the disclosure.

FIG. 5A shows a more detailed example and non-limiting schematic of the virtual agent system 100, in accordance with an example embodiment of the present disclosure. Herein, in some implementations, structure definitions 320 may include one or more of user's roles and responsibilities in the organization (e.g., "role" may be position such as secretary, manager, etc. and "responsibility" may be the tasks and business processes related to each position), roles definitions (e.g., may define set of business processes related to roles), organization chart, access rights (e.g., authority to trigger a process such as CEO has authority to direct or instruct secretary on tasks), instance state context (e.g., status of building block/object in structure definitions-such as department head may have a status as being "on holiday"), and the like. The structure definitions 320 may optionally refer to the structure definitions library 304 for referenced details related to the user's roles and responsibilities in the organization, roles definitions, organization chart, access rights, instance state context, and the like. The behavior definitions 322 therein may include information about business processes and workflows defining one or more of procedures and protocols related to the organization (e.g., definition information that may relate to protocols, behaviors such as business processes, and workflows which may be represented by, e.g., means of flow charts). The behavior definitions 322 may optionally refer to the behavior definitions library 306 that may include referenced information about the one or more of protocols, behaviors, processes, and workflows related to the organization. As shown in the example, behavior definitions library 306 may include multiple atomic dialog definitions 330 (e.g., related to business processes/work flows 328 within the behavior definitions 322) and sub-processes 332. Herein, the atomic dialog definitions 330 may be parameterizable and the sub-processes 332 may relate to the one or more processes of the organization, which may be implemented frequently. Such sub-processes 332 may be grouped together in a sub-processes library for faster access purposes. In some implementations, the sub-processes 332 may be arranged in the library such that the corresponding sub-processes 332 may be accessed by multiple users in the organization.

The examples below show how information in the Definitions Module 302 may be defined to allow a CEO-Secretary (or other position) to accept a request from a CEO (or other position) for a management team meeting and to invite all department heads by telephone call to the meeting.

Figure 7:
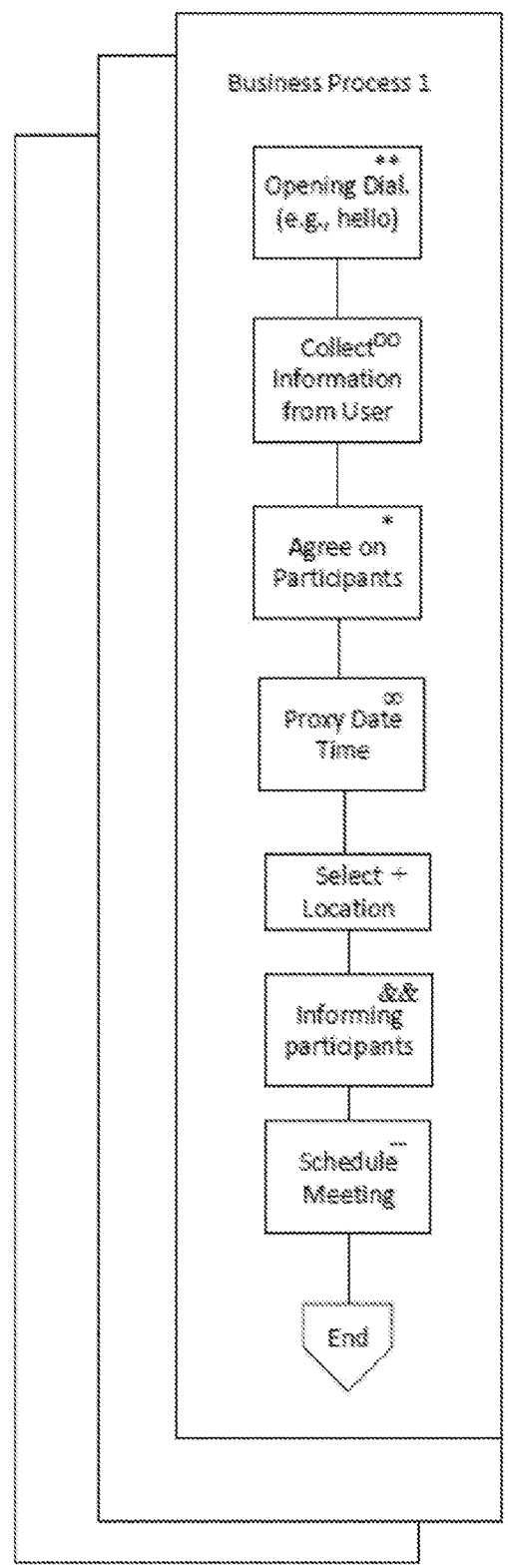
FIG. 7 is an example business process implemented by the virtual agent system according to another example implementation of the disclosure.

Example "Structure Definitions":
Example Org Chart:
  CEO—
    CEO-Secretary
    HEAD of SALES—Sales Department HEAD of FINANCE—Finance Department HEAD of R&D—R&D Department
Roles & Responsibilities:
  CEO-Secretary:
    Call-for-Management-Meeting (REMARK:
      a process definition detailing this responsibility/Task) may be provided as a business process—for example business process 1 in FIG. 7 shows an example management meeting business process)
    REMARK: Name here other processes related to CEO-Secretary HEAD of SALES:
    REMARK: Name here all processes related to this role HEAD of FINANCE:
    REMARK: Name here all processes related to this role HEAD of R&D:
    REMARK: Name here all processes related to this role
Structure Definitions Library:
  CEO: Name and contact details
  CEO Secretary Name and contact details HEAD of SALES: Name and contact details HEAD of
  FINANCE: Name and contact details HEAD of R&D: Name and contact details OPTIONAL: Other details of departments
Example "Behavior Definitions":
Example Business Processes/Work Flows:
CEO-Secretary [Role Name]—Call-for-Management-Meeting [Business Process]
  TRIGGER: CEO-Request: Management-Meeting-by-call
  FOR EACH HEAD REPORTING TO CEO (REMARK: Info comes from
    Structure Definitions)
    Call-for-Management—Meeting-Request
  [End For]—Update CEO calendar
Example Behavior Definitions Library:
SUBPROCESS: Call-for-Management-Meeting-Request
  STEP 1: Initiate telephone call, Do again if nobody answers STEP 2:

START CALL
STEP 3: COMMUNICATE REQUEST: Management-Meeting, Date, Time, Place STEP 4: CONFIRMATION: Date, Time, Place
STEP 5: CLOSE CALL
STEP 6: Terminate telephone call
SUBPROCESS: CEO-Request
STEP 1: Answer telephone call STEP 2: START ANSWER
STEP 3: REQUEST IDENTIFICATION: Management-Meeting-by-call STEP 4:
CONFIRMATION: Date, Time, Place
STEP 5: CLOSE CALL
STEP 6: Terminate telephone call
EXAMPLE: ATOMIC Dialog List: (REMARK: Routines and data sets for atomic dialogues are redefined and provided by a system/platform vendor)
"Initiate telephone call": Routine to stablish telephone call, INPUT: CALLER ID "Answer telephone call": Routine taking the phone and analyze CALLER ID "Terminate telephone call": Routine to terminate telephone connection
START CALL: Dialog to start a telephone call with greeting procedure (SAYHello), introduce yourself, verify right person is on the line by voice
START ANSWER: Dialog to answer a telephone call with response to greeting (SAY Hello), verify right person is on the line by voice
REQUEST INDENTIFICATION: Dialog identifying CEO intent and parameters
COMMUNICATE REQUEST: Dialog for telling what the CEO wants to do: CEO-calls-for-Meeting, Date, Time, Place
CONFIRMATION: Dialog to verify exchanged info and to prevent misunderstandings
CLOSE CALL: Say "thank you" and "good-by"

Further, as shown in the example implementation of FIG. 5A, the client application 308 may include a behavior engine 402 (e.g., for managing work flows), a multi-modal engine 404 (e.g., for managing graphical user interface (GUI) and speech dialogues), and a control unit 406 (e.g., for steering the system setup and loading files for the client application 308). Alternatively, or additionally, the server 318 may include another implementation of the multi-modal engine 404.

Figure 5B:
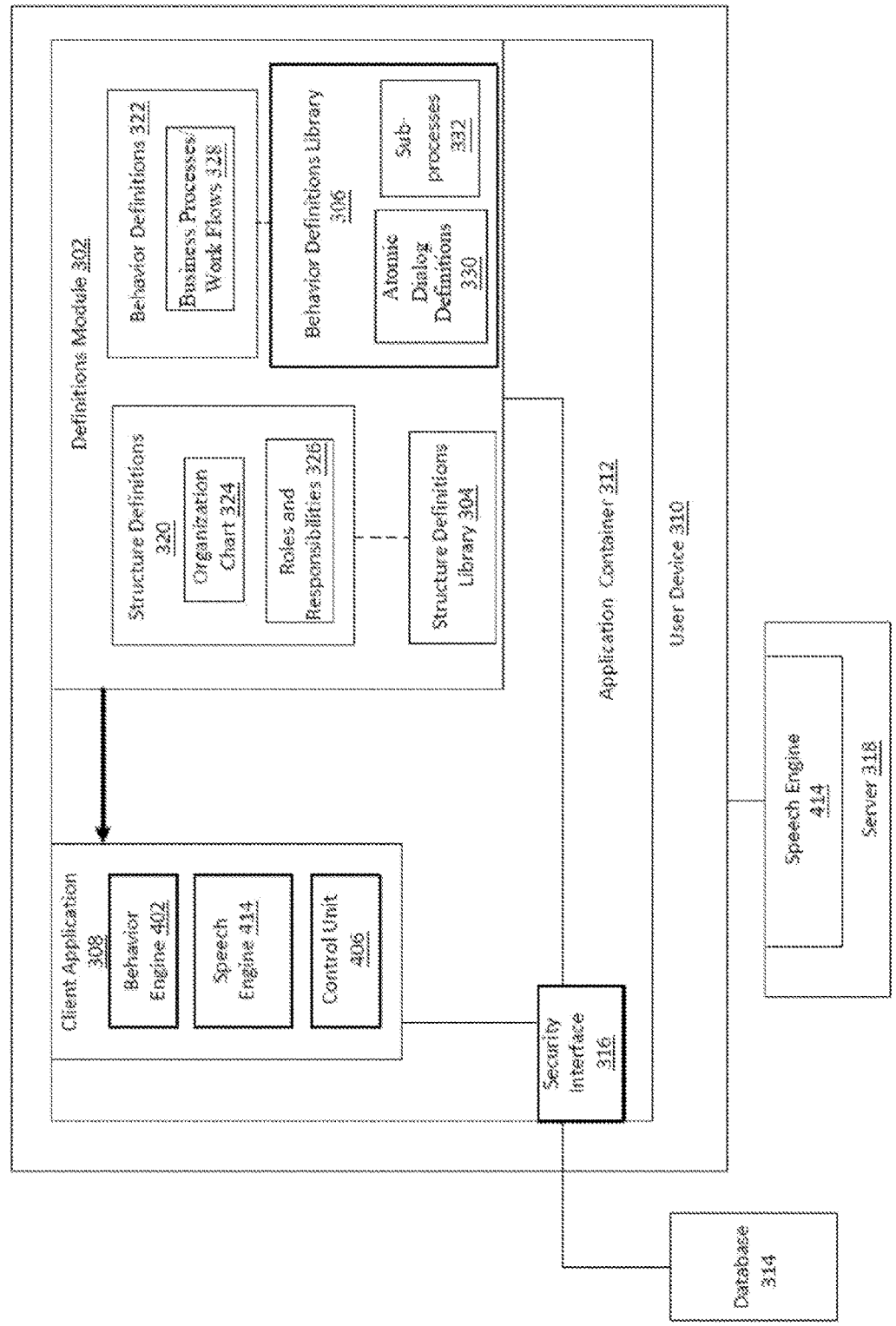
FIG. 5B is an example schematic view of the virtual agent system of FIG. 4 according to another example implementation of the disclosure.

FIG. 5B shows another example and non-limiting detailed schematic of the virtual agent system 100, in accordance with an implementation of the present disclosure. Herein, in some implementations, the client application 308 may include a speech engine 414, instead of the multi-modal engine 404 of FIG. 5A for providing an interface limiting user interaction to speech dialogs. This interface may interact with speech-related content, e.g., receiving speech from user to be recognized and sending synthesized speech from virtual agent system 100. Similarly, the server 318 may include an implementation of the speech engine 414, instead of the multi-modal engine 404 of FIG. 5A. As described above, inputs from users may be received as process requests that may be analyzed by the multi-modal engine 404 or the speech engine 414. For example, the speech engine 414 may only process speech input (e.g., user may say something like "yes" to confirm an input) whereas the multi-modal engine 404 may support different types of modalities (e.g., a confirmation may be done by speech-such as a user saying "yes", haptic-user may press a button corresponding with "yes", etc.).

The multi-modal engine 404 may be configured for loading definitions as well as receiving and analyzing the process request (e.g., in the form of at least one of speech, text, haptic, gesture and graphic) from the user. In relevant example implementations, the speech engine 414 may be configured for loading definitions as well as receiving and analyzing the process request (e.g., in the form of natural language speech) from the user. It may be understood that the process request may be received in the client application 308 by some input device (not shown) associated with the multi-modal engine 404 and/or the speech engine 414 of the virtual agent system 100. Such input device may vary based on the form of the process request. For example, for speech input, a microphone or the like may be employed: for text input, a physical or virtual keyboard or the like may be employed: for haptic input, a touch-screen or the like may be employed: for gesture input, a camera or the like may be employed; and so on.

The multi-modal engine 404 and the speech engine 414 may be configured so as to handle server-side driven multi-model requests (e.g., when the client may forward requests to the server 318), embedded/client-side multi-model requests (e.g., when client has capabilities that are needed to process multi-model input and may work as stand-alone without the support from the server 318), as well as hybrid requests (e.g., where parts of the tasks may be executed on the server 318 and other parts may be executed on the client side such as at the client application 308). It is contemplated that the speech engine 414 may be configured in a similar manner without any limitations. Hereinafter, such an engine for loading definitions as well as receiving and analyzing the process requests is described in terms of the speech engine 414 but may also be applied to the multi-modal engine 404 following similar steps (not necessarily in any particular order) without affecting the scope of the present disclosure.

In the virtual agent system 100, the speech engine 414 may provide speech technology functionality, such as, but not limited to, audio enhancement, automatic speech recognition (ASR), natural language understanding (NLU), dialog management using dialog manager (e.g., with question/answer types of dialog), natural language generation (NLG), text-to-speech (TTS), etc. (as discussed in more detail later). The speech engine 414 may, generally, be a program code (e.g., executable piece of code) that may execute assigned configurations and resource files in the form of atomic dialogs, as available from the behavior definitions library 306. In summary, the speech engine 414 may utilize the atomic dialogue references to load one or more configurations and resource files specified in definitions of atomic dialogues. In the virtual agent system 100, the atomic dialogs may define and describe the one or more configurations and resource files of the speech engine 414 and may generally enable the speech engine 414 to analyze the process request having the organization specific terms and commands. The atomic dialogs may encapsulate organization specific terminology, configurations, grammars, etc. (as will be discussed in subsequent paragraphs in more detail). In one or more examples, the atomic dialog references may be independent of the language (e.g., English, French, Spanish, etc.), for example, of the speech; and, in such cases, a separate translation engine may be employed by the client application 308. In some examples, the atomic dialogs may include greetings or small discussions which may vary depending on organization, communication partner within the organization chart 324, and/or user, such as, geographical region, age of user, gender of user, proficiency/experience of user, familiarity of user with the system 100, personal preferences of user, application, time of the day, etc.

In some implementations, the definitions module 302 may be configured to describe behavior of the virtual agent system 100 as interpreted by the client application 308. Thus, the structure definitions 320, but also referenced information in the structure definitions library 304, may vary with user (e.g., change from employee role to director role/officer role). This may be required as the roles and responsibilities of a Chief Executive Officer (CEO) may be different from the roles and responsibilities of a secretary of the CEO. As discussed, the definitions module 302 may include business process models, user behavior, roles and responsibilities 326 (e.g., tasks, assignments, staffing), organization chart 324, and business process library. The definitions module 302 may provide information on behavior, context data, flow models, organization models, and a client description of how the virtual agent system 100 may behave through descriptive definitions (e.g. organization chart 324, business processes/work flows 328, etc.) understood as data, by generating the behavior model which may be input to the client application 308.

In the client application 308, the received definitions may be loaded/unloaded and set into/out of operation by the control unit 406. The control unit 406 may, generally, be a processing arrangement to load/unload and verify consistency of behavioral models. The control unit 406 may load modelling descriptions, for example, based on the organization chart 324 and business processes/work flows 328 (e.g., modelled business processes and/or modelled work flows) of the definitions module 302.

The behavior engine 402 in combination with multi-modal engine 404 (respectively speech engine 414) may perform tasks or operations (e.g., call employee, set up meeting, etc.) based on role of the user as well as user's behavior and responsibilities (e.g., as obtained from employee designation from the organization chart), business process models, etc. The organization chart may provide structure of employee roles in company and may define with whom the data may be shared. In some examples, the behavior of company employees may be pulled or obtained from formal business or company processes.

Figure 6:
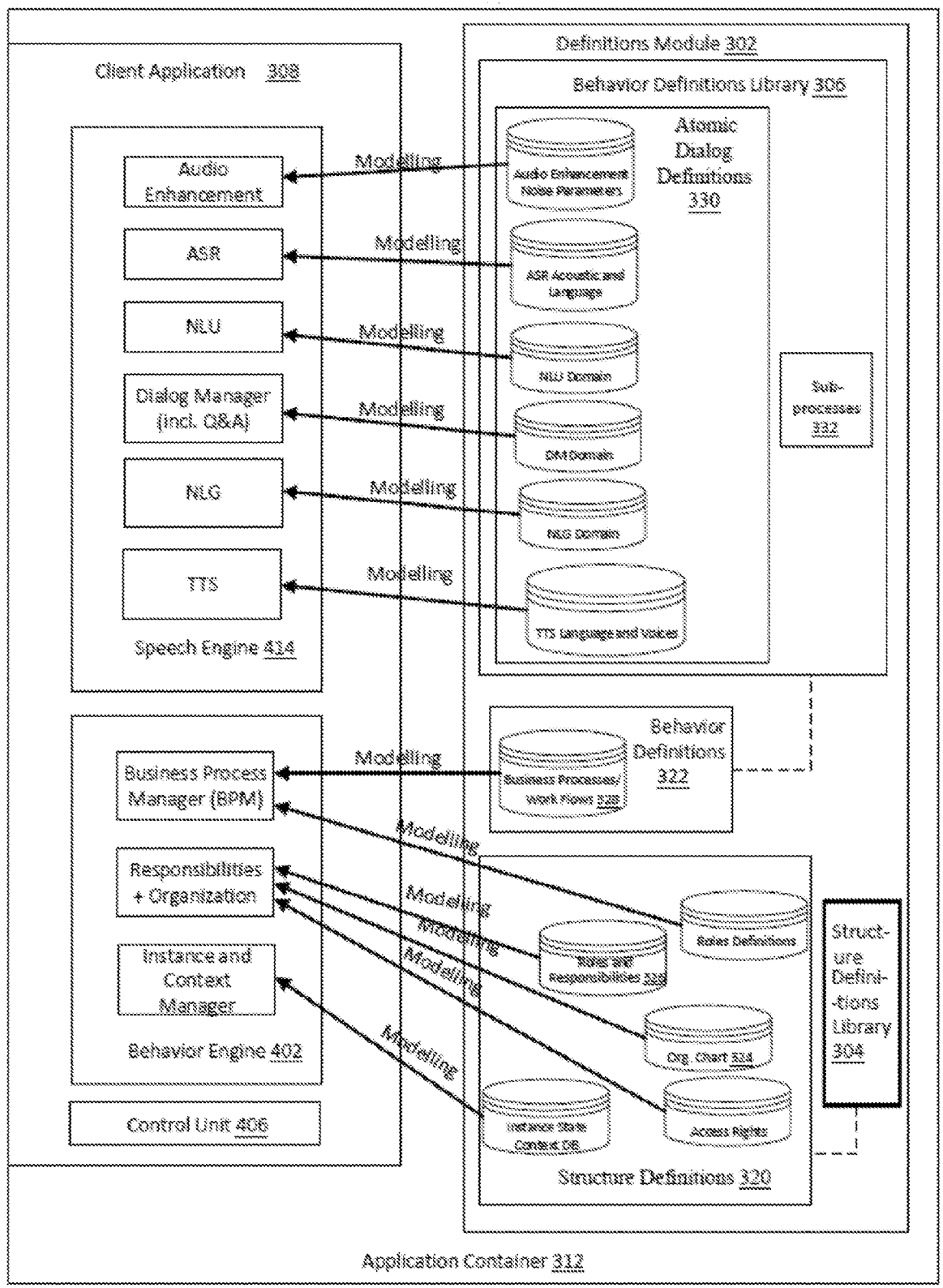
FIG. 6 is an example schematic of an application container of FIG. 5B according to another example implementation of the disclosure.

FIG. 6 shows an example and non-limiting schematic of the application container 312 showing the interactions between the definitions module 302 and the client application 308. As shown in FIG. 6, all atomic dialogue definitions 330 (e.g., speech configuration modules, definition files of preexisting and preconfigured atomic dialogues) may be part of the behavior definitions library 306, whereas business process models and/or workflow models (e.g., business processes/workflows 328) may be separate components within behavior definitions 322 in the definitions module 302. Other configurations may also be possible. As may be seen, each atomic dialog definition of the atomic dialog definitions 330 may correspond to at least one codec element in the multi-modal engine 404 and/or the speech engine 414 of the client application 308 The codec element may encapsulate one of audio enhancement, automatic speech recognition (ASR), natural language understanding (NLU), natural language generation (NLG), text-to-speech (TTS) and dialog manager (DM). Also, it may be seen from FIG. 6, that the sub-processes 332 (e.g., frequently used smaller parts of a business process) may be grouped in the behavior definitions library 306. The virtual agent system 100 may accept the business process model down to layer of small business process elements in the form of atomic dialogs, and for each small business process, there may be a predefined, potentially parameterizable, atomic dialog available in the library thereof. For example, the individual steps in the modelled business process may correspond with related dialog (in any form—e.g., speech, text, haptic, gesture, graphic, etc.) referred to as atomic dialog. The atomic dialog may be utilized at relevant steps of the modelled business process.

Generally, FIG. 6 shows modelling of specific data sources by related components of the speech engine 414 and the behavior engine 402. As shown, models for the speech engine 414 may be obtained from data sources which may be part of the atomic dialogue definition files (as referred to as atomic dialog definitions 33) within the behavior definitions library 306 of the definitions module 302: for example, audio enhancement models from audio enhancement noise parameters (e.g., sent to audio enhancement of speech engine 414), automatic speech recognition (ASR) models from ASR acoustic and language (e.g., sent to ASR of speech engine 414), natural language understanding (NLU) models from NLU domain (e.g., sent to NLU of speech engine 414), natural language generation (NLG) models from NLG domain (e.g., sent to NLG) of speech engine 414, text-to-speech (TTS) models from TTS language and voices (e.g., sent to TTS of speech engine 414), and dialog manager (DM) models from DM domain (e.g., sent to Dialog Manager of speech engine 414). Further, as illustrated, models for the behavior engine 402 may be obtained from the structure definitions 320 and behavior definitions 322 in the definitions module 302. For example, business process models (e.g., business process manager (BPM) models) and work flow models from business processes/work flows 328 of behavior definitions 322 (e.g., sent to business process manager (BPM) of behavior engine 402—that may accept business processes and may execute on tasks in business process as well as may monitor where system is in in process (e.g., which step in business process) during execution). Also, role models may be obtained from one or more of roles definitions of structure definitions 320 (e.g., sent to BPM of behavior engine 402), responsibilities (which may be a collection/list of BPs belonging to a role) and organization models from user roles and responsibilities 326 of structure definitions 320) (e.g., sent to responsibilities and organization of behavior engine 402), organization chart 324 (e.g., sent to responsibilities and organization of behavior engine 402), access rights (e.g., sent to responsibilities and organization of behavior engine 402), and instance and context manager models from instance state context database (e.g., sent to instance and context manager of behavior engine 402). In some implementations, the modelled processes (e.g., setting up a meeting) for the system 100 may be implemented by the business process manager of the behavior engine 402.

FIG. 7 shows an example implementation of a business process 1 (which may be at least a portion of the virtual agent process 10 and vice versa) within business processes/workflows 328 of the behavior definitions 322. The example business process 1 may utilize business process charts for business process modeling for the purpose of organizing a meeting. Specifically, FIG. 7 shows various steps (not necessarily in any particular order) (and related atomic dialogues) on how to initiate/configure the client application 308 with a specific business process 1 (e.g., organizing a meeting). This business process 1 may be modelled and loaded to the client application 308 for execution (e.g., loaded to behavior engine 402 for execution). As shown in FIG. 7, the business processes/workflows 328 may include other business processes that may be saved together in behavior definitions 322. The modeling language may enable users to implement changes in a simple way. The business process 1 may implement atomic dialogues to realize elementary steps in the business process such that these elementary steps or blocks in business process 1 may take advantage of a parameterizable library such as the atomic dialogue definitions 330. In one implementation, for each step, there may be one corresponding atomic dialog. In such cases, instead of executing entire dialogue for a complete business process, the system 100 may execute entire dialogue for specific topics step-by-step (e.g., in scheduling a meeting) to provide a more efficient, controlled, and faster approach. Some example atomic dialogues in relation to FIG. 7 may include how to reserve room, how to ask people for date, how to do opening dialogue, how to select location, how to inform participants, etc. Each step of business process 1 or at least some of the steps may relate to an atomic dialogue and each atomic dialogue may be pre-defined in a library (e.g., atomic dialog definitions in behavior definitions library). Each step of business process 1 and each related atomic dialogue may be re-arranged in business process 1 based on changes in user behavior with respect to company business process 1. Accordingly, the business process model may be a sequence of few atomic dialogs that correspond to steps in business process 1.

As discussed throughout, some of the atomic dialogues stored in the library may be reused. The system 100 may model different processes by using the same atomic dialogues to improve quality thereof over time, as completion rate of dialogues becomes maximum (e.g., close to 100%). It may be understood that completion rate and overall quality may increase for large amounts of dialogue on a focused topic. In some implementations, reused atomic dialogues may be optimized independently from a larger dialog model (e.g., complete business process model). Such a larger dialog model (e.g., complete business process model) may benefit from simple change management supporting the optimization to continuously improve quality of modelled business processes (e.g., when driven by the user, ability for continuous improvement may be a request of modern quality management systems). Also, it may be understood that blocks of the business process may be flexibly or dynamically rearranged as user changes behavior with respect to continuously improving business process. Generally, "continuous improvement" may refer to quality management and may be an important key feature in all quality management systems (QMSs). In some examples, the capability of the system 100 for continuous improvement may be assessed by QMS audit.

In some implementations, the system 100 may model dialogs (e.g., via virtual agent process 10) as a flow of actions or atomic dialogues. By doing dialogues/conversations based on knowledge, in some cases, the system 100 may need a different modelling methodology for each type of dialogue or conversation. It may be contemplated by a person skilled in the art that each block of dialogue may be a story line and may have a mark for recognizing a particular block step. The system 100 may only require a small set of atomic dialogs and each organization may be allowed to model their own business processes based on their process requirements. In some implementations, the system 100 may allow for changing of connections between blocks of atomic dialogue as well as changing of each block of atomic dialogue separate from other blocks. This may be considered different from standard dialogue systems, in which if one removes a block in an AI based dialogue system, then the entire system needs to be re-trained with new, updated, modified and verified training data. However, in the system 100, if one atomic dialogue block is impacted by a change request, then only changed atomic dialogue may need to be re-trained, and there may be no need to retrain rest of process and other atomic dialogue blocks. This may allow for convenient business process modelling in companies without much dependency on the platform supplier. In examples where an atomic dialogue, a business process (BP), and/or organization chart may be changed, the definitions module 302 may be automatically updated. In these examples, the application container 312 may stop and restart the entire process, and the client application 308 may receive models that have been automatically updated based on the changes. In some examples, changes may be implemented by superimposing changes over models such that the models may be updated.

Figure 8:
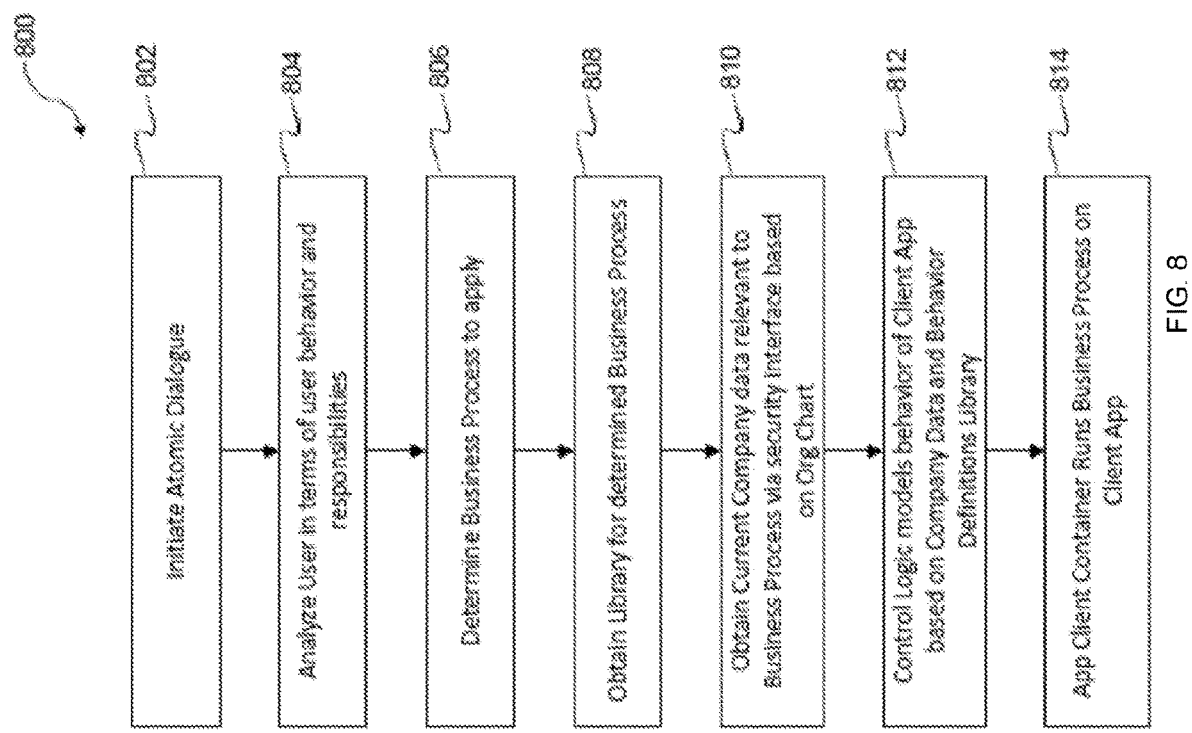
FIG. 8 is an example flowchart of another aspect of a virtual agent process for loading and running a business process according to one or more example implementations of the disclosure.

FIG. 8 shows another example virtual agent process 800 (e.g., a startup and configuration method that is similar to the virtual agent process 10) of the application container 312 for loading and running a business process on the client application 308. In some examples, the virtual agent process 800 may be executed, at least in part, by virtual agent system 100. The virtual agent process 800 may be based on a determination of a business process from analysis of a user in terms of user behavior and responsibilities. Virtual agent process 800 may initiate 802 the atomic dialogues. These atomic dialogues (and possibly sub-processes) are loaded in beginning of the virtual agent process 800 by the control unit 406 for defining possible steps in the business process (e.g., atomic dialogue definitions loaded into client application 308). Virtual agent process 800 may analyze 804 the user in terms of user behavior and responsibilities. For this purpose, the structure definitions 320 of the definitions module 302 may be utilized. Virtual agent process 800 may determine 806 the business process to apply; and further, virtual agent process 800 may obtain 808 the corresponding library for the determined business process from behavior definitions 322 and referenced information in behavior definitions library 306 (as discussed in the preceding paragraphs). Virtual agent process 800 may obtain 810 the company data relevant for execution of the determined business process. The company data may be obtained via the security interface 316 based on the organization chart 324 of the structure definitions 320. The security interface 316 may provide security measures to limit access to the company data. At step 812, the control unit 406 may model behavior of the client application 308 based on the company data and the behavior definitions library 306 (as discussed in the preceding paragraphs). At step 814, the application container 312, in the user device 310, may run business process based on the model in the client application 308.

In an example, the virtual agent system 100 may be used to arrange or set up a meeting. In this example, the system 100 may function on behalf of a secretary of a CEO on request of CEO for a department team (e.g., marketing team). For this example virtual agent process, there may be an initial step of defining models for the definitions module 322. Further, this example virtual agent process may utilize an organization chart 324 that has information used to verify marketing team for existence along with verify or validate role of secretary with respect to marketing team and CEO. In some examples, the organization chart 324 may be high level and not include details surrounding members whereas in other examples the organization chart 324 may include details surrounding members. For this example, the structure definitions library 304 may include details of marketing department whereas the organization chart 324 may only list "marketing team" department. Virtual agent system 100 (e.g., via virtual agent process 10, 800) may scan referenced structure definitions 320 for details on members of marketing team, etc. In this example, the organization 324 chart may be incomplete such that the virtual agent system 100 (e.g., via virtual agent process 10, 800) may scan the structure definitions library 304 for further details to e.g. confirm members of marketing team. The system may scan data of roles and responsibilities 326 (regarding secretary of CEO) that may include knowledge of CEO secretary's role/responsibility with respect to setting up meetings as well as a list of users who may be authorized and capable to setup meetings for the marketing team (in this example, the CEO's secretary would be on list). Business processes/ workflows 328 of the behavior definitions 322 may include information of ordered steps for setting up meetings for the marketing team which may be utilized by system 100 as a modelled business process. Behavior definitions 322 may refer to behavior definitions library 306 for further details and/or information regarding business processes/workflow 328. The ordered steps (e.g., step by step) may refer to elementary steps within a business process/workflow of the business processes/workflows 328 (not necessarily in any particular order). Details of the steps may be defined in the behavior definitions library 306. Each step may be defined as an atomic dialogue which may be defined as step-related topic dialogues (e.g., date dialogue-what is the date?), knowledge of months dialogue, numbers dialogue, knowledge of calendar dialogue (e.g., date is on weekend, do you want to schedule during week?). Multiple steps may be grouped together as a sub-process within subprocesses 332 (e.g., for meeting participants, asking for date, verifying conflicts, confirming meetings, etc.). Steps in sub-process may be additional sub-processes or alternatively atomic dialogues.

The client application 308 may load (as directed by control unit 406) models of the above described definitions 304, 322 and referenced libraries 304, 306. This may include checking for correction of description such as completeness, consistency (e.g., where marketing team and sales team may be in another related document). The speech engine 414 may be used to load all files (e.g., files may have modelled information) related to atomic dialog definitions 330. The behavior engine 402 may load all files related to one or more of the following: behavior definitions 322, sub-processes 332, and other items of behavior definitions library 306 as well as structure definitions 320 and structure definitions library 304. Models may be defined statically, dynamically, etc. on-demand from other sources or internally. The client application 308 (e.g., collaboration application 20 or one or more of client applications 22, 24, 26, 28) may receive a request to setup a meeting. The request may be verified for correctness which may include one or more of the following: confirming existence of marketing team based on organization chart 324, verifying user giving order (e.g., CEO) is authorized based on organization chart 324, confirming members of team based on structure definitions 320, and offering other competences and processes to respond to requests other than organizing meeting (e.g., offer other tasks such as sending out a document, service offering, etc.). Because of roles and responsibilities 326, system 100 may allow and authorizes the secretary to perform and execute the business process of arranging or setting up the marketing meeting. Accordingly, steps of business process from business processes/work flows 328 may be executed through a step-by-step work flow and/or sequence of atomic dialogues from atomic dialog definitions 330 (and optionally from sub-processes 332). The security interface 316 may provide user (e.g., secretary) with limited access to calendar entries (e.g., company data from database 314) of team for the purpose of workflow. The secretary may organize meeting by sending a calendar entry with topic, date, location, and the like to designated members of meeting.

In this example, the request may be sent and received internally or the request may be sent externally and received at user's device which may result in a request being verified. In an alternative implementation, some of the processes of the client application 308 may be run on the server 318. In addition to setting up a meeting, virtual agent system 100 (e.g., via virtual agent process 10) may be used for customer support, handling sales requests, handling initial context (when someone calls company), handling all job requests of customer facing teams, automate customer calls, etc.

In the virtual agent system 100, the behavior of the client application 308 may be controlled by the models inputted to the client application 308. It may be understood that the system 100 may need only one version of client application 308 for all users, since its specific behavior may only depend on the descriptions in the definitions module 302. The client application 308 may be automatically encoded with different behavior which may be defined by different models, such as, from business processes/work flows 328, organization charts 324, libraries 304, 306, etc. from the definitions module 302. In summary, the client application 308 may morph employee behavior based on data in user's role and responsibilities. In the system 100, the overall dialogue may be implicitly generated because of processes, sub-processes 332, and usage of atomic dialogues (based on atomic dialog definitions 330). The purpose of the control unit 406 may be to load any instance and its related definition elements of each kind properly as well as to make sure that referred library models in the received model do exist and are properly used. Thereby, the control unit 406 may provide for power up or system start, in case descriptions do change, and finally shut down. Thus, the control unit 406 may be a type of configuration manager since the control unit 406 may manage loading/unloading descriptions in the definitions module 302.

The virtual agent system 100 (e.g., via virtual agent process 10) may be implemented in an organization for assisting the user by combining natural language processing (NLP) with other forms of artificial intelligence (AI), primarily machine learning and deep learning, to provide sophisticated and intelligent assistance to the user for carrying out organization processes and to expand the use cases beyond customer service and simple tasks. The system 100 may implement speech technology which may include ASR, NLU, TTS, Dialog Manager, etc. and may used with blocks of the business process modelling. The implementation of atomic dialogues with business process modelling may ensure that speech related aspects are encapsulated properly. The atomic dialogs may enable a simple rollout in any language of the organization without any limitations.

The virtual agent system 100 may build a kind of operating system (OS) for respective execution environment for any description of business processes and organization charts, structured teams or groups of users (e.g., potentially inside or outside the company such as partners, customers, or prospective customers), and assigned employees/staff. The organization charts and business processes may be defined broadly: however, the virtual agent system 100 may assign/staff tasks and responsibilities with real people. In the virtual agent system 100, the business process may be executed in parallel to each other. As may be contemplated, there may be some basic assumptions for executing the virtual agent system 100 in the organization. For example, the virtual agent system 100 may act in the context of the organization chart which may provide clear guidance, such as which users may be allowed to communicate and share information, and the like.

The virtual agent system 100 may complement business process management (BPM) to group individual roles and business processes to larger responsibilities which may be executed and supported by a virtual agent. Such roles may be defined based on an organization chart which may provide a hierarchy report in given structures and thus allow exchange of information in a controlled way. For example, an employee's rights to access and process sensitive company data may be based on the employee's role and responsibility inside the context of the organization hierarchy. Thus, the present system 100 may provide accessibility from an organization perspective. The system 100 may utilize company's organization chart to define access to employees or use of information in a company and may further implement company process documents (e.g., from quality management systems) to define a standard process for accomplishing various tasks (e.g., such as setting up a meeting). Accordingly, the virtual agent system 100 may define behavior of virtual agents inside a company or relevant to customer groups or customer segments (e.g., regions of customers, new customers, etc.). The virtual agent system 100 may introduce a delivery mechanism by giving developers an easy-to-configure and ready-to-use virtual agent for multimodal user interfaces since descriptions in the definitions module 302 may be platform independent and may be run on all platforms once the client application 308 has been compiled for the intended platform.

The virtual agent system 100 may enable modelling of the behavior of the virtual agent by using existing data files already available in any organization (e.g., business process models, organization charts, role descriptions, flow charts, etc.). Such data files may be simple, easy to understand, and may not require use of third party service to understand and adapt these rather simple and easy to understand models. Furthermore, the system 100 may provide a modeling approach for the virtual agent which may be language independent since language-specific behavior may be coded in atomic dialogues. The client application 308 may ensure that a variety of individual and application-specific versions of the virtual agent may be easily run on any platform such that no specific application development project may be needed to rollout the virtual agent within the company ecosystem, internally as well as for external partners like customers, partners, dealers, etc.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A virtual agent system including one or more processors and one or more memories configured to perform operations comprising:
    loading at least one model related to one or more processes of an organization, wherein the at least one model is based on structure information and one or more of procedures and protocols related to the organization, wherein the structure information is included in a set of structure definitions, and wherein the set of structure definitions comprises a user responsibility in the organization;
    storing process data related to the organization in a datastore;
    receiving and analyzing a process request, related to the one or more processes of the organization, from a user of the organization, to implement the at least one model to execute the one or more processes in response to the process request when the user of the organization has process rights in the user responsibility in the organization to execute the process request and using a security interface to limit access to the process data when the user of the organization lacks the process rights in the user responsibility in the organization to execute the process request, wherein the process rights are based on a profile of the user of the organization;
    determining that the process request changes an atomic dialog definition of a plurality of atomic dialog definitions associated with the one or more processes of the organization; and
    retraining the atomic dialogue definition based upon the process request without retraining the plurality of atomic dialog definitions.

2. The virtual agent system of claim 1, wherein receiving and analyzing the process request is in the form of at least one of speech, text, haptic, gesture, and graphic.

3. The virtual agent system of claim 1, wherein the process request is in the form of natural language speech.

4. The virtual agent system of claim 1, wherein the set of structure definitions refers to a structure definitions library.

5. The virtual agent system of claim 4, wherein the structure definitions library further comprises at least one of a user role in the organization, roles definitions, organization chart, access rights, and an instance state context.

6. The virtual agent system of claim 1, wherein the one or more of procedures and protocols is included in a set of behavior definitions that refer to a behavior definitions library.

7. The virtual agent system of claim 6, wherein the behavior definitions library comprises the plurality of atomic dialog definitions, wherein each atomic dialog definition of the plurality of atomic dialog definitions corresponds to at least one codec element.

8. The virtual agent system of claim 7, wherein the at least one codec element encapsulates one of audio enhancement, automatic speech recognition (ASR), natural language understanding (NLU), natural language generation (NLG), text-to-speech (TTS), and dialog manager (DM).

9. The virtual agent system of claim 7, wherein the plurality of atomic dialog definitions are parameterizable.

10. The virtual agent system of claim 6, wherein the behavior definitions library comprises sub-processes related to the one or more processes of the organization.

11. The virtual agent system of claim 1, wherein the loading of the at least one model and the receiving and analyzing of the process request are implemented in a user device.

12. The virtual agent system of claim 1, wherein the security interface is further configured to at least one of access rights, process rights, distribute rights, communicate rights, and execute rights.

13. A computer program product residing on a non-transitory computer readable storage medium having a plurality of instructions stored thereon which, when executed across one or more processors, causes at least a portion of the one or more processors to perform operations comprising:
  loading at least one model related to one or more processes of an organization, wherein the at least one model is based on structure information and one or more of procedures and protocols related to the organization, wherein the structure information is included in a set of structure definitions, and wherein the set of structure definitions comprises a user responsibility in the organization;
  storing process data related to the organization in a datastore;
  receiving and analyzing a process request, related to the one or more processes of the organization, from a user of the organization, to implement the at least one model to execute the one or more processes in response to the process request when the user of the organization has process rights in the user responsibility in the organization to execute the process request and using a security interface to limit access to the process data when the user of the organization lacks the process rights in the user responsibility in the organization to execute the process request, wherein the process rights are based on a profile of the user of the organization;
  determining that the process request changes a predefined atomic dialog definition of a plurality of predefined atomic dialog definitions associated with the one or more processes of the organization; and
  retraining the predefined atomic dialogue definition based upon the process request without retraining the plurality of predefined atomic dialog definitions.

14. The computer program product of claim 13 wherein the analyzing the process request is based on the plurality of predefined atomic dialog definitions.

15. The computer program product of claim 14 wherein the plurality of predefined atomic dialog definitions are parameterizable.

16. The computer program product of claim 14 wherein each predefined atomic dialog definition of the plurality of predefined atomic dialog definitions corresponds to at least one codec element encapsulating one of audio enhancement, automatic speech recognition (ASR), natural language understanding (NLU), natural language generation (NLG), text-to-speech (TTS), and dialog manager (DM).

17. A computer-implemented method for an organization, comprising:
  loading at least one model related to one or more processes of an organization, wherein the at least one model is based on structure information and one or more of procedures and protocols related to the organization, wherein the structure information is included in a set of structure definitions, and wherein the set of structure definitions comprises a user responsibility in the organization;
  storing process data related to the organization in a datastore;
  receiving and analyzing a process request, related to the one or more processes of the organization, from a user of the organization;
  implementing the at least one model to execute the one or more processes in response to the process request when the user of the organization has process rights in the user responsibility in the organization to execute the process request and using a security interface to limit access to the process data when the user of the organization lacks the process rights in the user responsibility in the organization to execute the process request, wherein the process rights are based on a profile of the user of the organization;
  determining that the process request changes a predefined atomic dialog definition of a plurality of predefined atomic dialog definitions associated with the one or more processes of the organization; and
  retraining the predefined atomic dialogue definition based upon the process request without retraining the plurality of predefined atomic dialog definitions.

18. The computer-implemented method of claim 17 further comprising analyzing the process request based on the plurality of predefined atomic dialog definitions, wherein the plurality of predefined atomic dialog definitions are parameterizable.

19. The computer-implemented method of claim 18, wherein each predefined atomic dialog definition of the plurality of predefined atomic dialog definitions corresponds to at least one codec element encapsulating one of audio enhancement, automatic speech recognition (ASR), natural language understanding (NLU), natural language generation (NLG), text-to-speech (TTS), and dialog manager (DM).

* * * * *